(12) United States Patent
Nishimura et al.

(10) Patent No.: US 7,976,098 B2
(45) Date of Patent: Jul. 12, 2011

(54) SIDE VEHICLE-BODY STRUCTURE OF VEHICLE

(75) Inventors: Yoshikazu Nishimura, Hiroshima (JP); Katsuyoshi Ishigame, Hiroshima (JP)

(73) Assignee: Mazda Motor Company (JP)

( * ) Notice: Subject to any disclaimer, the term of this patent is extended or adjusted under 35 U.S.C. 154(b) by 23 days.

(21) Appl. No.: 12/637,004

(22) Filed: Dec. 14, 2009

(65) Prior Publication Data

US 2010/0194146 A1    Aug. 5, 2010

(30) Foreign Application Priority Data

Jan. 30, 2009   (JP) ................... 2009-020340

(51) Int. Cl.
*B62D 25/04* (2006.01)
(52) U.S. Cl. .................................. 296/193.06
(58) Field of Classification Search ............. 296/193.05, 296/193.06, 187.12, 187.03, 202
See application file for complete search history.

(56) References Cited

U.S. PATENT DOCUMENTS

| | | | | |
|---|---|---|---|---|
| 5,382,071 A * | 1/1995 | Enning et al. | ............ | 296/203.03 |
| 5,548,934 A * | 8/1996 | Israelson | ............ | 52/220.8 |
| 5,613,727 A * | 3/1997 | Yamazaki | ............ | 296/203.03 |
| 6,328,376 B2 * | 12/2001 | Son | ............ | 296/203.03 |
| 6,474,726 B1 * | 11/2002 | Hanakawa et al. | ............ | 296/191 |
| 6,789,840 B2 * | 9/2004 | Honma et al. | ............ | 296/203.03 |
| 6,877,330 B2 * | 4/2005 | Hille et al. | ............ | 62/244 |
| 6,877,787 B2 * | 4/2005 | Ito et al. | ............ | 296/70 |
| 6,910,732 B2 * | 6/2005 | Miyoshi et al. | ............ | 296/203.03 |
| 6,988,763 B2 * | 1/2006 | Saeki | | |
| 7,036,576 B2 * | 5/2006 | Okamoto et al. | | |
| 7,070,228 B2 * | 7/2006 | Shimizu et al. | | |
| 7,121,615 B2 * | 10/2006 | Hoshino | | |
| 7,152,914 B2 * | 12/2006 | Dingman et al. | | |
| 7,252,585 B2 * | 8/2007 | Ichikawa et al. | | |
| 7,264,302 B2 * | 9/2007 | Nagashima | | |
| 7,407,222 B2 * | 8/2008 | Anderson et al. | | |
| 7,815,247 B2 * | 10/2010 | Obayashi | | |
| 2006/0208537 A1 * | 9/2006 | Dingman et al. | | |
| 2007/0004492 A1 * | 1/2007 | Salmento | | |
| 2008/0143144 A1 * | 6/2008 | Yustick et al. | | |
| 2008/0315628 A1 * | 12/2008 | Obayashi | | |

FOREIGN PATENT DOCUMENTS

JP        2004-130826 A       4/2004

* cited by examiner

*Primary Examiner* — Lori L Lyjak
(74) *Attorney, Agent, or Firm* — Studebaker & Brackett PC; Donald R. Studebaker

(57) ABSTRACT

A pillar reinforcement of a center pillar comprises an upper part and a lower part with a boundary line of these parts being positioned below the middle level of the pillar reinforcement. The upper and lower parts respectively include side wall portions which extend along a vehicle side face and pairs of vertical wall portions which extend inwardly from front and rear end portions of the side wall portions. The pair of vertical wall portions of the lower part is slant relative to the vehicle width direction so that the distance between the vertical wall portions becomes wider toward the inward direction, and a slant angle of the pair of vertical wall portions of the lower part is greater than that of the vertical portions of the upper part.

11 Claims, 11 Drawing Sheets

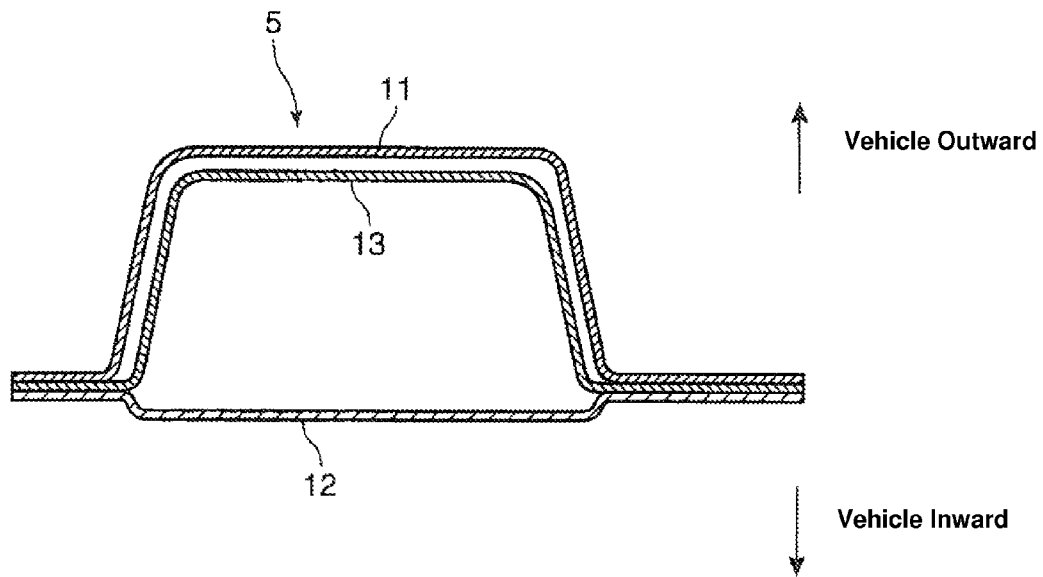
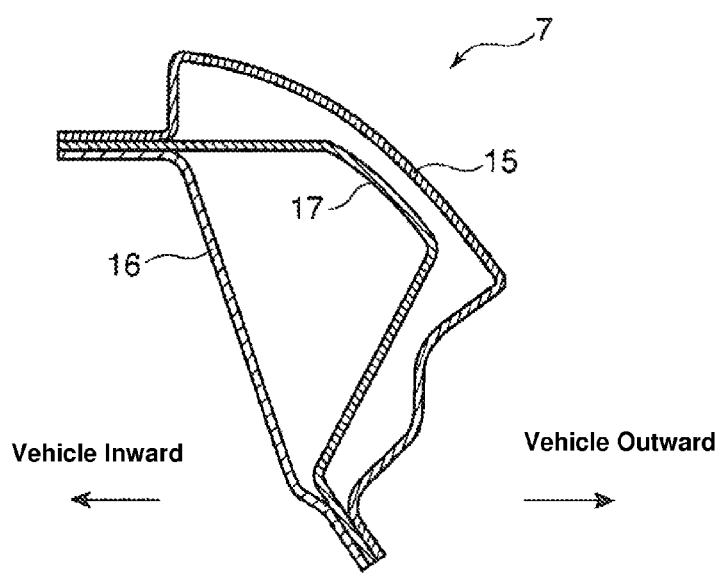

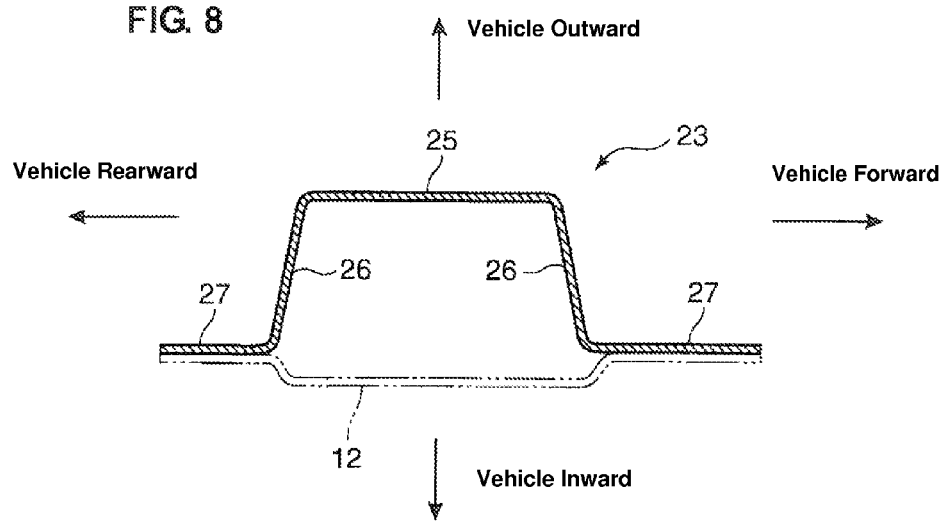
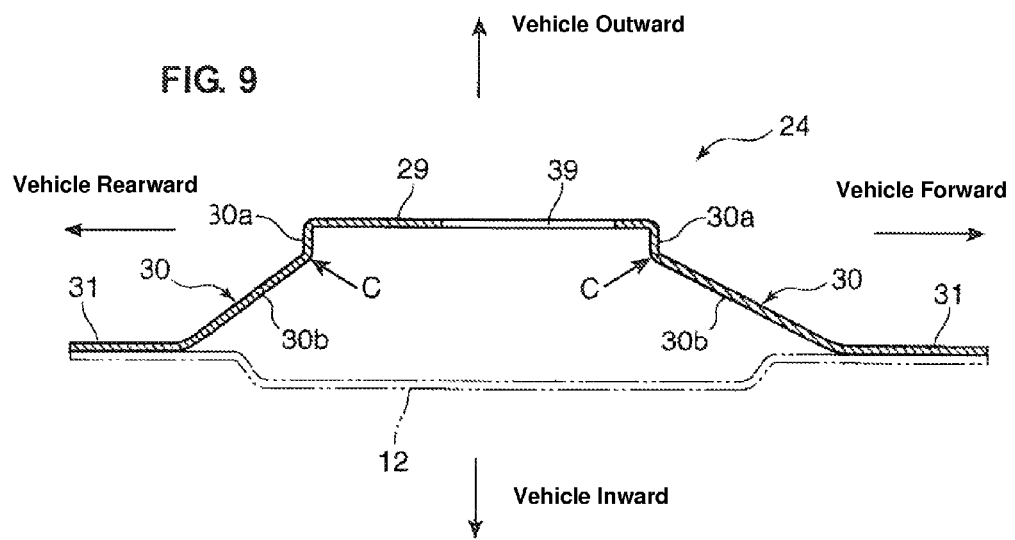

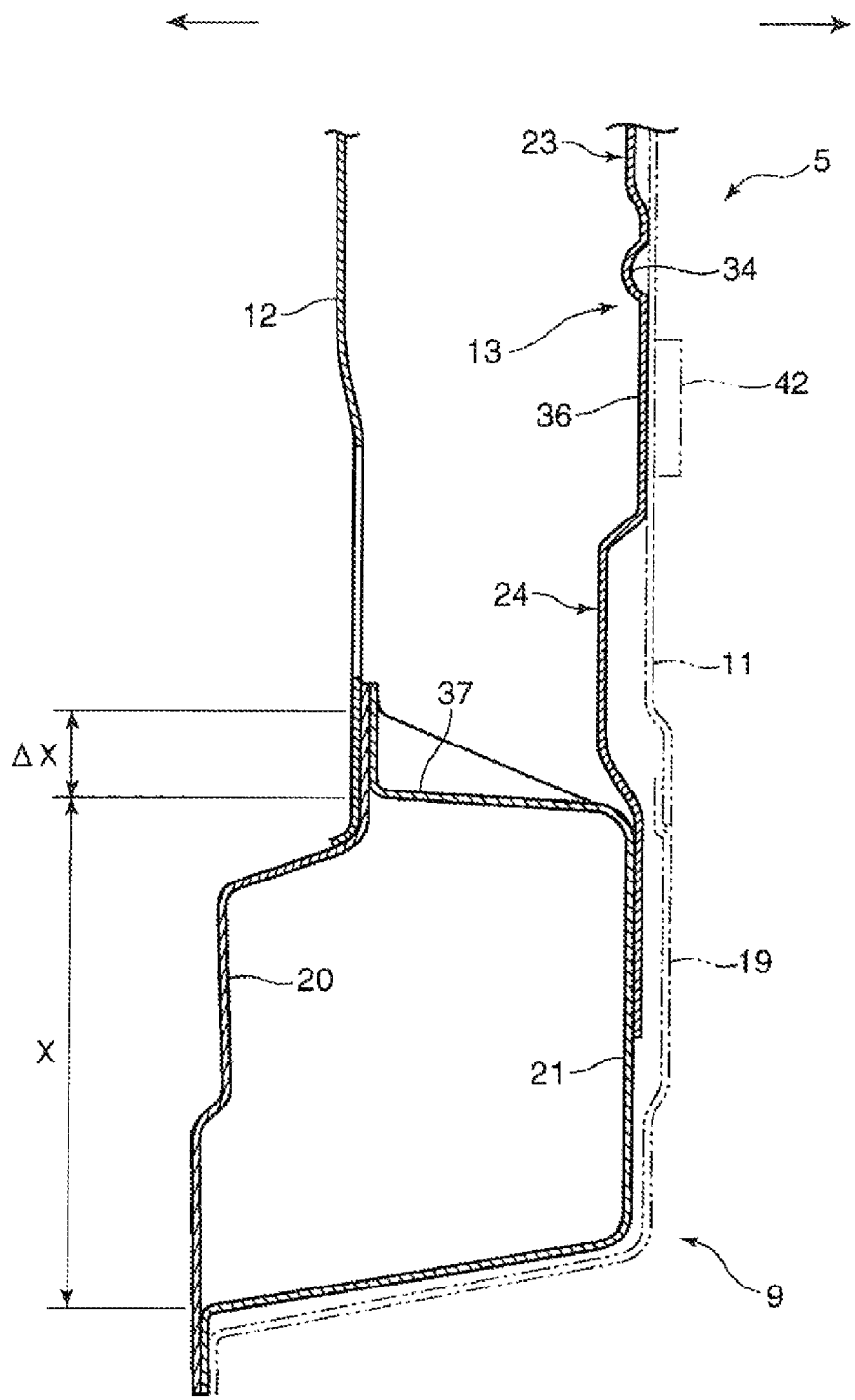

SIDE VEHICLE-BODY STRUCTURE OF VEHICLE

BACKGROUND OF THE INVENTION

The present invention relates to a side vehicle-body structure of a vehicle, which comprises a center pillar which includes a pillar reinforcement which is provided between a pillar outer panel and a pillar inner panel.

Conventionally, various types of vehicle-body structure of restraining deformation of the center pillar for the purpose of ensuring the safety of passengers at the vehicle side crash have been developed. For example, Japanese Patent Laid-Open Publication No. 2004-130826 discloses the structure, in which a weak portion which has a relatively low rigidity compared to the other portions is formed at a lower portion of the center pillar, a full section plastic moment stepped portion is formed at an upper portion of the center pillar so that the full section plastic moment with its center in a vehicle longitudinal direction is discontinuous, and a full section plastic moment value of the lower side portion which is below the plastic moment stepped portion is set to be higher than a full section plastic moment straight line which interconnects respective moment values of the upper end portion and the middle portion of the center pillar.

Specifically, according to the structure of the above-described publication, a second pillar reinforcement which extends over a range from the moment stepped portion to the middle portion of the center pillar is provided in addition to the normal reinforcement which is provided between the pillar outer panel and the pillar inter panel. The moment stepped portion is formed by a specified portion which corresponds to the upper end portion of this second pillar reinforcement.

The above-described structure has an advantage that since the center pillar bends at the movement stepped portion located at its upper portion and the weak portion located at its lower portion at the vehicle side crash, the center pillar can be prevented from bending at its middle portion, so that the bent center pillar may not come into the vehicle inside improperly greatly.

This structure, however, has a problem in that since the second pillar reinforcement is additionally provided to form the moment stepped portion for the purpose of causing the bend deformation at the centre pillar, the center pillar's structure would become rather complex and the whole weight of the center pillar would increase improperly as well.

SUMMARY OF THE INVENTION

The present invention has been devised in view of the above-described matters, and an object of the present invention is to provide a side vehicle-body structure of a vehicle which can restrain the center pillar from coming into the vehicle inside at the vehicle side crash with a simpler structure.

According to the present invention, there is provided a side vehicle-body structure of a vehicle, comprising a center pillar which includes a pillar outer panel, a pillar inner panel, and a pillar reinforcement which is provided between the pillar outer panel and the pillar inner panel, wherein the pillar reinforcement comprises an upper part and an lower part, a boundary line of the upper and lower parts of the pillar reinforcement being positioned below a middle level of the pillar reinforcement in a vertical direction of a vehicle body, wherein each of the upper and lower parts of the pillar reinforcement includes a side wall portion which extends along a side face of the vehicle body and a pair of vertical wall portions which extend inwardly in a vehicle width direction from front and rear end portions of the side wall portion, and wherein at least one of the pair of vertical wall portions of the lower part of the pillar reinforcement is slant relative to the vehicle width direction so that the distance between the pair of vertical wall portions becomes wider toward an inward direction in the vehicle width direction, a slant angle of the at least one of the pair of vertical wall portions of the lower part of the pillar reinforcement being greater than that of the vertical portions of the upper part of the pillar reinforcement.

According to the present invention, since at least one of the pair of vertical wall portions of the lower part of the pillar reinforcement is slant relative to the vehicle width direction so that the distance between the pair of vertical wall portions becomes wider toward the inward direction in the vehicle width direction, when the vehicle side crash occurs and the impact load toward the vehicle side acts on the lower part of the pillar reinforcement, the vertical wall potions can easily deform so as to fall down (falling down toward the side of the pillar inner panel), thereby promoting crush of the lower part of the pillar reinforcement. Meanwhile, since the upper part of the pillar reinforcement which constitutes the upper and middle portions of the pillar reinforcement does not have so slant vertical wall portions as the lower part of the pillar reinforcement does, the load resistance of the upper part of the pillar reinforcement against the load of the vehicle width direction can be ensured sufficiently. Thus, when the vehicle-side-crash impact load toward the vehicle inside is inputted to the center pillar, the lower portion of the center pillar including the above-described lower part deforms greatly, so that the energy of this impact load can be absorbed by this portion and also deformations of the upper and middle portions of the center pillar including the upper part which has the higher load resistance can be effectively restrained. Then, since the center pillar deforms in the above-described deformation mode, the middle portion of the center pillar in the vertical direction can be prevented from bending greatly toward the vehicle inside, thereby effectively preventing any improper interference of the center pillar with passengers in the vehicle.

Further, since the above-described prevention of bending of the middle portion of the center pillar can be achieved with a simple structure in which the section shape of the pillar reinforcement is just changed (different section shapes between the upper part and the lower part), the restraint of the center pillar from improperly coming into the vehicle inside at the vehicle side crash can be simply and effectively achieved.

According to an embodiment of the present invention, at least one of the pair of vertical wall portions of the lower part of the pillar reinforcement comprises a base portion which extends inwardly in the vehicle width direction from the side wall portion, a slant portion which extends obliquely forward or rearward from the base portion, and a corner portion which formed between the base portion and the slant portion. Thereby, since the wall portion of the lower part of the pillar reinforcement easily deforms so as to fall down toward the vehicle inside (toward the side of the pillar inner panel) at the corner portion at the vehicle side crash, the deformation of the lower portion of the center pillar including the lower part of the pillar reinforcement can be effectively promoted, so that the bending of the middle portion of the center pillar can be prevented and thereby the passenger can be properly protected.

According to another embodiment of the present invention, a hinge attaching portion to which a door hinge of a rear side door is attached is provided at the upper part of the pillar reinforcement. Thereby, since the rear side door is supported at the upper part of the pillar reinforcement having the high load resistance via the door hinge, the support rigidity of the rear side door can be effectively improved.

According to another embodiment of the present invention, the hinge attaching portion includes a lower hinge-attaching portion which is provided near a lower end portion of the upper part of the pillar reinforcement for attachment of a lower door hinge of the rear side door, and a bend promoting portion which is bent at a vehicle side crash to promote bending of the pillar reinforcement is formed at a position which is located above the lower hinge-attaching portion. Thereby, since the center pillar tends to bend at the bend promoting portion receiving the impact load inputted from the lower door hinge at the vehicle side crash, the bending of the middle portion of the center pillar can be avoided surely. Accordingly, the center pillar can be more effectively prevented from greatly coming into the vehicle inside to interfere with passengers.

According to another embodiment of the present invention, a lower end portion of the center pillar is connected to a side sill which extends in a vehicle longitudinal direction, and a deformation promoting portion to promote deformation of the side sill when the center pillar receives an impact load of a vehicle side crash is provided at a connection portion of the center pillar to the side sill. Thereby, a situation in which the deformation of the lower portion of the center pillar is so obstructed by the side sill that a desired deformation mode may not be obtained can be effectively prevented.

According to another embodiment of the present invention, the deformation promoting portion comprises a concave which is formed at an upper face of a reinforcement of the side sill or an opening which is formed at an upper face of a reinforcement of the side sill.

In case of the opening portion, the opening may be preferably of a quadrilateral shape, a pair of sides of which extends in the vehicle width direction and the other pair of sides of which extends in the vehicle longitudinal direction. Thereby, the deformations of the side sill in the vehicle width direction or the vehicle longitudinal direction which may be necessary for the desired deformation mode of the center pillar at the vehicle side crash can be effectively promoted by the above-described quadrilateral shaped opening. Accordingly, the center pillar can be made deform with the desired deformation mode more surely.

According to another embodiment of the present invention, the pillar reinforcement is a press member which is formed through a thermal pressing. Thereby, the center pillar can be reinforced without any further increase of its weight, so that the bending of the middle portion of the center pillar can be prevented more surely from bending at the vehicle side crash.

Other features, aspects, and advantages of the present invention will become apparent from the following description which refers to the accompanying drawings.

BRIEF DESCRIPTION OF THE DRAWINGS

FIG. 3 is a sectional view taken along line III-III of FIG. 2.
FIG. 4 is a sectional view taken along line IV-IV of FIG. 2.

FIG. 8 is a sectional view taken along line VIII-VIII of FIG. 6.
FIG. 9 is a sectional view taken along line IX-IX of FIG. 6.
FIG. 10 is a sectional view taken along line X-X of FIG. 6.

DETAILED DESCRIPTION OF THE INVENTION

Hereinafter, a preferred embodiment of the present invention will be described referring to the accompanying drawings.

Figure 1:
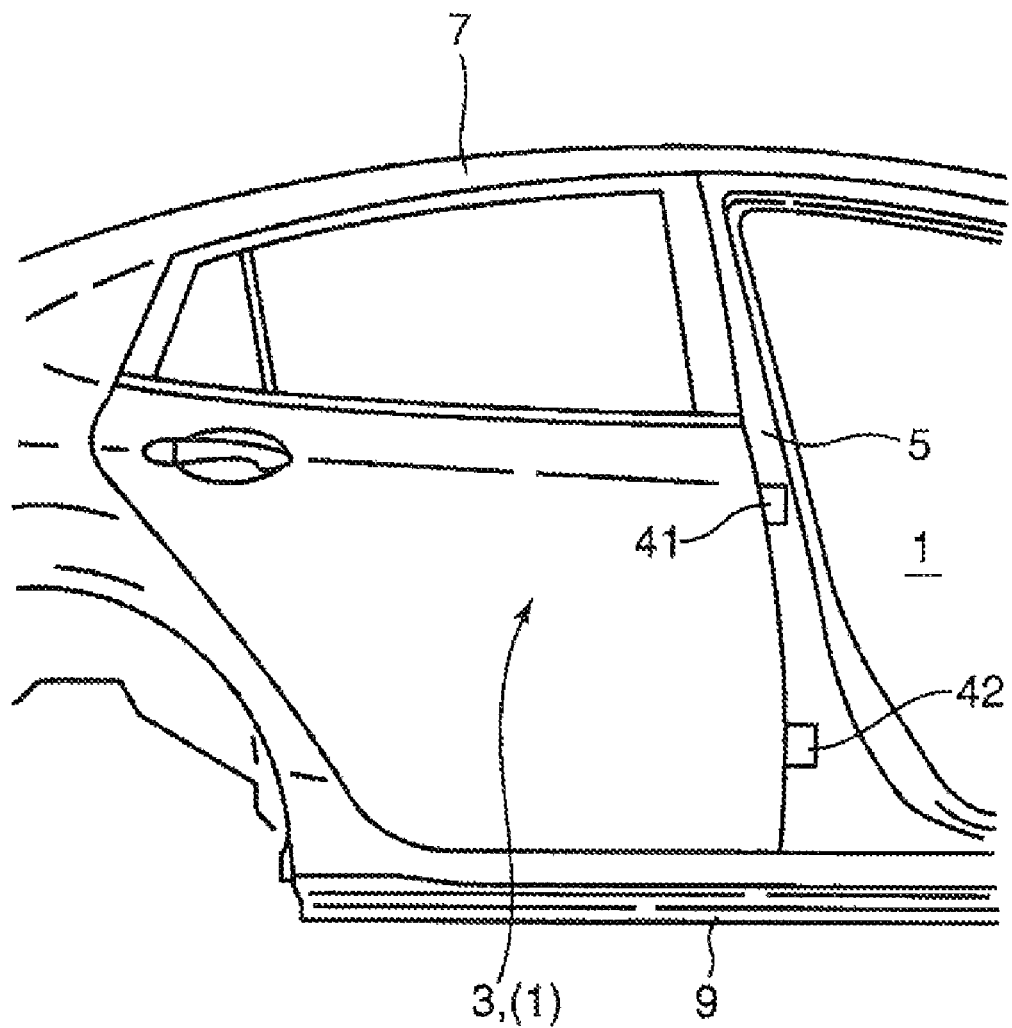
FIG. 1 is a side view showing a side vehicle-body structure of a vehicle according to an embodiment of the present invention.
Figure 2:
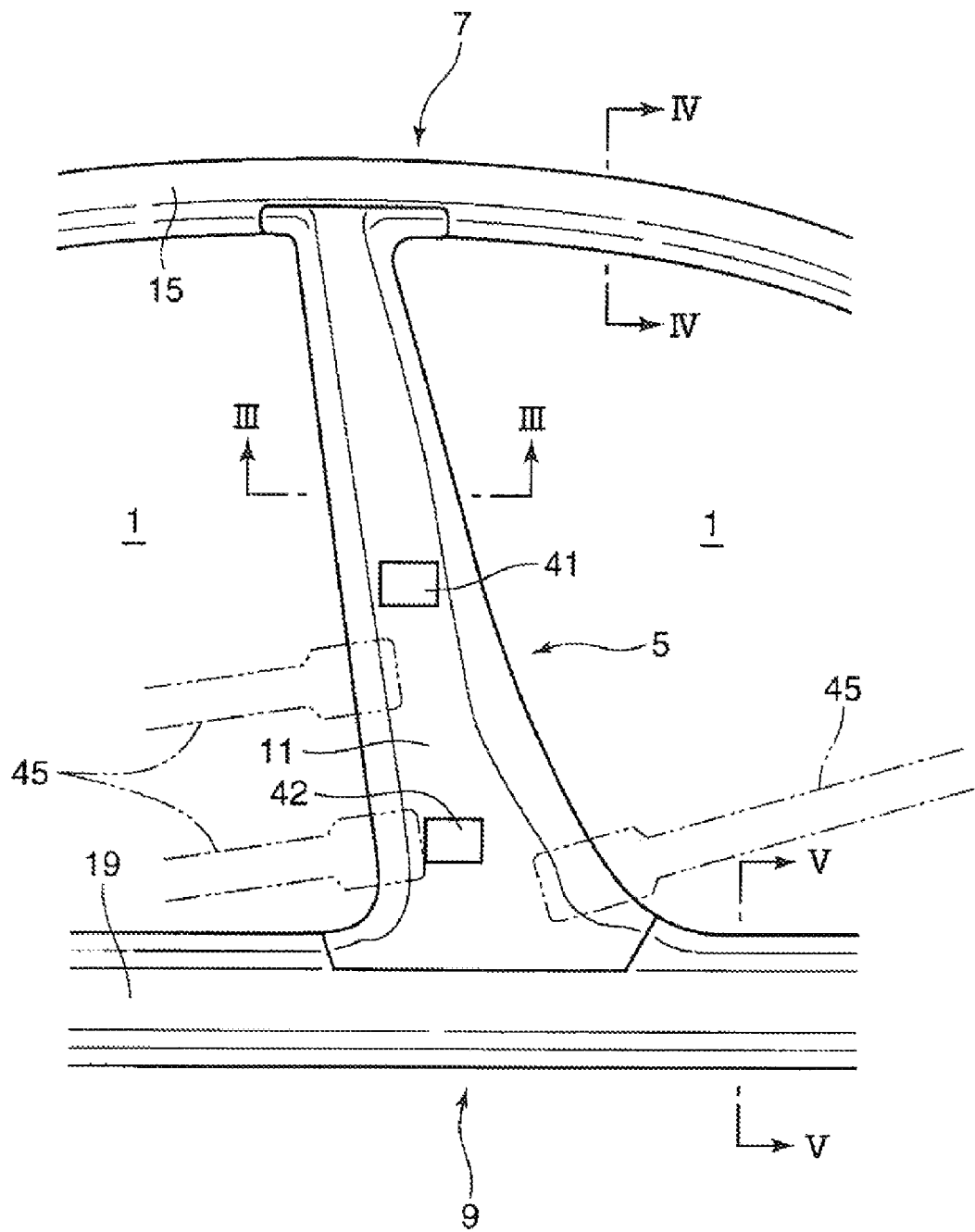
FIG. 2 is an enlarged view of FIG. 1, which shoes a vehicle-body side portion without a side door.

FIGS. 1 and 2 show a side vehicle-body structure of a vehicle according an embodiment of the present invention. An opening for ingress or egress 1 is formed at a side face of the vehicle shown in these figures, and this opening 1 is closable with a side door 3 (see FIG. 1). Herein, a four-door sedan type of automotive vehicle is exemplified, in which two openings 1 are arranged at both sides of the vehicle body in front of and in back of a center pillar 5, which will be described, and two side doors 3 are provided at these openings 1. Herein, a front-side side door (front side door) is omitted in FIG. 1, and the side door 3 illustrated is a rear side door which closes the rear opening 1.

A roof side rail 7 and a side sill 9 which extend in the longitudinal direction are provided at a side portion of the vehicle, which form an upper side and a lower side of the opening 1, respectively. The roof side rail 7 and the side sill 9 are interconnected via the center pillar 5 which extends vertically at their middle portions. Herein, members illustrated by two-dotted broken lines with reference numeral of 45 are impact bars which are arranged inside the side door 3.

Figure 5:
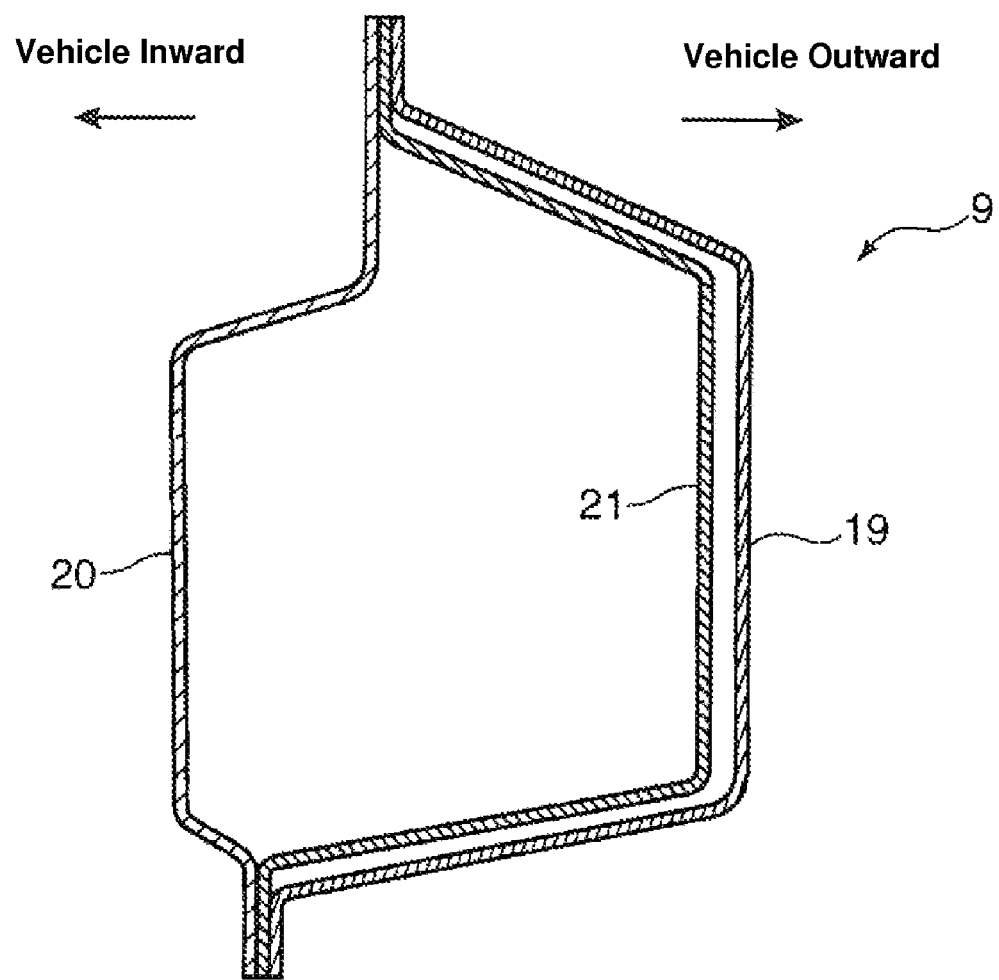
FIG. 5 is a sectional view taken along line V-V of FIG. 2.

FIGS. 3, 4 and 5 are sectional views of the center pillar 5, the roof side rail 7, and the side sill 9. The center pillar 5, as shown in FIG. 3, comprises a pillar outer panel 11, a pillar inner panel 12 which is disposed on the inside of the pillar outer panel 11, and a pillar reinforcement 13 which is disposed between the panels 11, 12. Likewise, the roof side rail 7, as shown in FIG. 4, comprises an outer panel 15, an inner panel 16, and a reinforcement 17, and the side rail 7, as shown in FIG. 5, comprises an outer panel 19, an inner panel 20, and a reinforcement 21.

Figure 6:
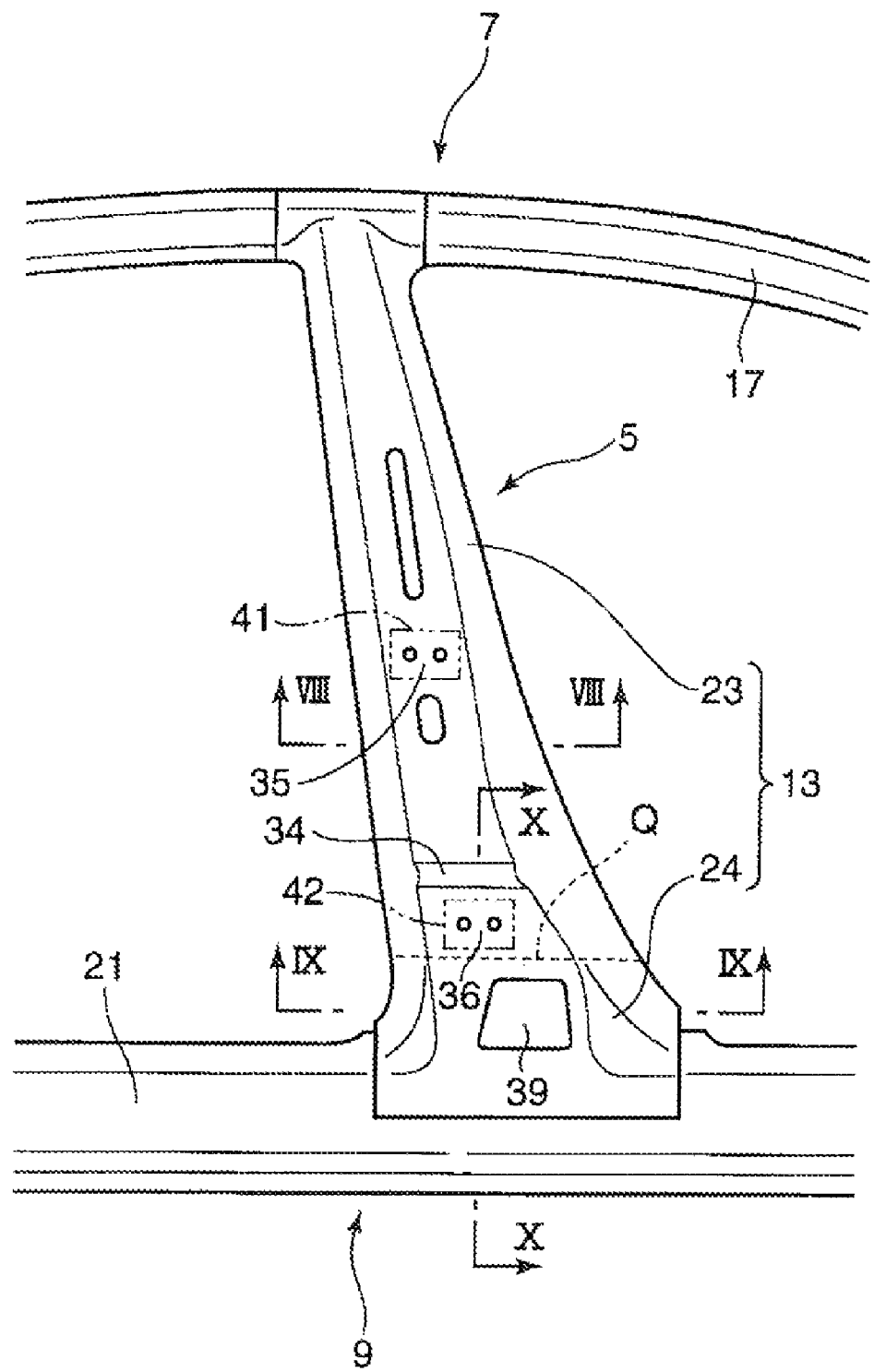
FIG. 6 is a view of the vehicle-body side portion, which corresponds to FIG. 2, without outer panels of a center pillar, a roof side rail, and a side sill.

FIG. 6 is a view of the vehicle-body side portion, which corresponds to FIG. 2, without the pillar outer panel 11 of the center pillar 5, the outer panel 15 of the roof side rail 7, and the outer panel 19 of the side sill 9. Thus, in FIG. 6 the respective reinforcements 13, 17, 21 are exposed to the outside because the respective outer panels 11, 15, 19 are removed, which is different from FIG. 2.

While the pillar reinforcement 13 of the center pillar 5 is made of a single member which is formed through pressing or the like as shown in FIG. 6, it comprises an upper part 23 and a lower part 24 which have different cross sections from each other. A reference character Q in the figure denotes a boundary line of the upper part 23 and the lower part 24, and it is positioned below a middle level of the pillar reinforcement 13 in the vertical direction. That is, the pillar reinforcement 13 comprises its upper part 23 and its lower part 24 which are separate from each other by the boundary line Q.

Figure 7:
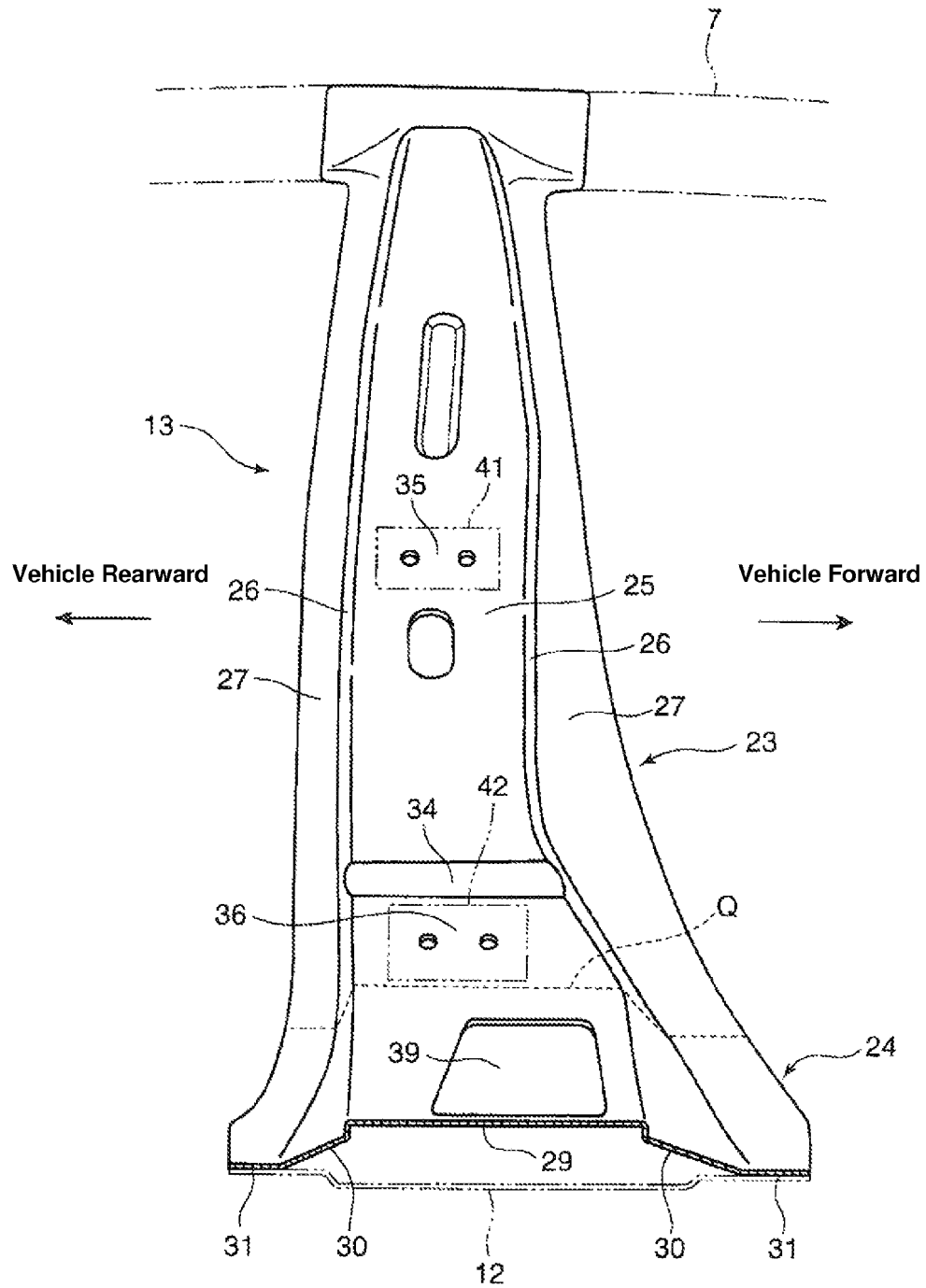
FIG. 7 is a perspective view of a pillar reinforcement.

FIG. 7 is a perspective view of the pillar reinforcement 13, and FIGS. 8 and 9 are sectional views of the upper part 23 and the lower part 24 of the pillar reinforcement 13, respectively. As shown in FIGS. 7 and 8, the upper part 23 includes a side wall portion 25 which extends along the side face of the vehicle body, a pair of vertical wall portions 26 which extend inwardly in the vehicle width direction from front and rear end portions of the side wall portion 25, and a pair of flanges 27 which extends longitudinally from longitudinal tips of the vertical portions 26 and are joined to the inner panel 12 of the center pillar 5. The vertical wall portions 26 extend inwardly with about the right angle relative to the side wall portion 25, so that the vertical portions 26 and the side wall portion 25 form a substantially U-shaped cross section.

Meanwhile, the lower part 24 has a longitudinally wider shape than the upper part 23 as shown in FIGS. 7 and 9. Specifically, the lower part 24 includes a side wall portion 29 which extends along the side face of the vehicle body, a pair of vertical wall portions 30 which extend obliquely inwardly in the vehicle width direction from front and rear end portions of the side wall portion 29, and a pair of flanges 31 which extends longitudinally from longitudinal tips of the vertical portions 30 and are joined to the inner panel 12 of the center pillar 5. Further, the lower part 24 includes an opening 39 which is formed at the side wall portion 29 as shown in FIGS. 6, 7 and 9.

The vertical wall portions 30 of the lower part 24 extend in different directions to be slant (obliquely forward and rearward) so that the distance between the vertical wall portions 30 becomes wider toward an inward direction in the vehicle width direction. The slant angle of the vertical wall portions 30 of the lower part 24 is greater than that of the vertical portions 26 of the upper part 23 (FIG. 8). That is, while the vertical wall portions 26 of the upper part 23 extend inwardly with about the right angle relative to the side wall portion 25 or extend obliquely forward and rearward with a considerably small slant angle, the vertical wall portions 30 of the lower part 24 extend obliquely forward and rearward with a larger slant angle.

The vertical wall portions 30 of the lower part 24 specifically, as shown in FIG. 9, comprises base portions 30a which extend inwardly in the vehicle width direction from the side wall portion 29, slant portions 30b which extend obliquely forward and rearward from the base portions 30a, and corner portions C which formed between the base portions 30a and the slant portions 30b.

Herein, the thickness of the lower part 24 including the widely slant vertical wall portions 30 in the vehicle width direction is smaller than that of the upper part 23 as apparent from FIGS. 8 and 9 (as shown in FIG. 10 as well).

As shown in FIGS. 1 and 2, a pair of upper and lower door hinges 41, 42 which supports the rear side door 3 is attached to the center pillar 5. In FIGS. 6 and 7, attaching portions of the door hinges 41, 42 at the pillar reinforcement 13 are denoted by reference numerals 35, 36. As apparent from these figures, the hinge attaching portions 41, 42 are formed at the upper part 23 of the pillar reinforcement 13, and no hinge attaching portion is formed at the lower part 24.

The hinge attaching portion 36 for the lower door hinge 42 (hereinafter, referred to as "lower hinge-attaching portion 36") is positioned near the lower end portion of the upper part 23, that is—slightly above the boundary line Q between the upper part 23 and the lower part 24. Meanwhile, the hinge attaching portion 35 for the upper door hinge 41 (hereinafter, referred to as "upper hinge-attaching portion 35") is positioned at around a middle portion of the upper part 23 which is located above the lower hinge-attaching portion 36.

FIG. 10 is a sectional view taken along line X-X of FIG. 6. In this figure the respective outer panels 11, 19 of the center pillar 5 and the side sill 8 are illustrated by two-dotted broken lines. As shown this figure, the upper part 23 of the pillar reinforcement 13 and the pillar outer panel 11 are closely arranged so as to overlap with each other at the lower hinge-attaching portion 36. The lower door hinge 42 is attached to this overlapping portion via bolts or any other means. In other words, the lower door hinge 42 is attached to the lower hinge-attaching portion 36 of the pillar reinforcement 13 with the pillar outer panel 11 which is put between the lower door hinge 42 and the lower hinge-attaching portion 36. Herein, while detailed illustration is omitted here, the upper door hinge 41 is attached to the upper hinge-attaching portion 35 in the same manner as the lower door hinge 42.

As shown in FIGS. 6, 7 and 10, a concave groove 34 which is concaved inwardly having an arc-shaped cross section is formed at a position which is located near the lower end portion of the upper part 23 and slightly above an upper end portion of the lower hinge-attaching portion 36 so as to extend longitudinally. Herein, the concave groove 34 is configured to cause a bending at the vehicle side crash, which corresponds to a bend promoting portion of the present invention.

Figure 11:
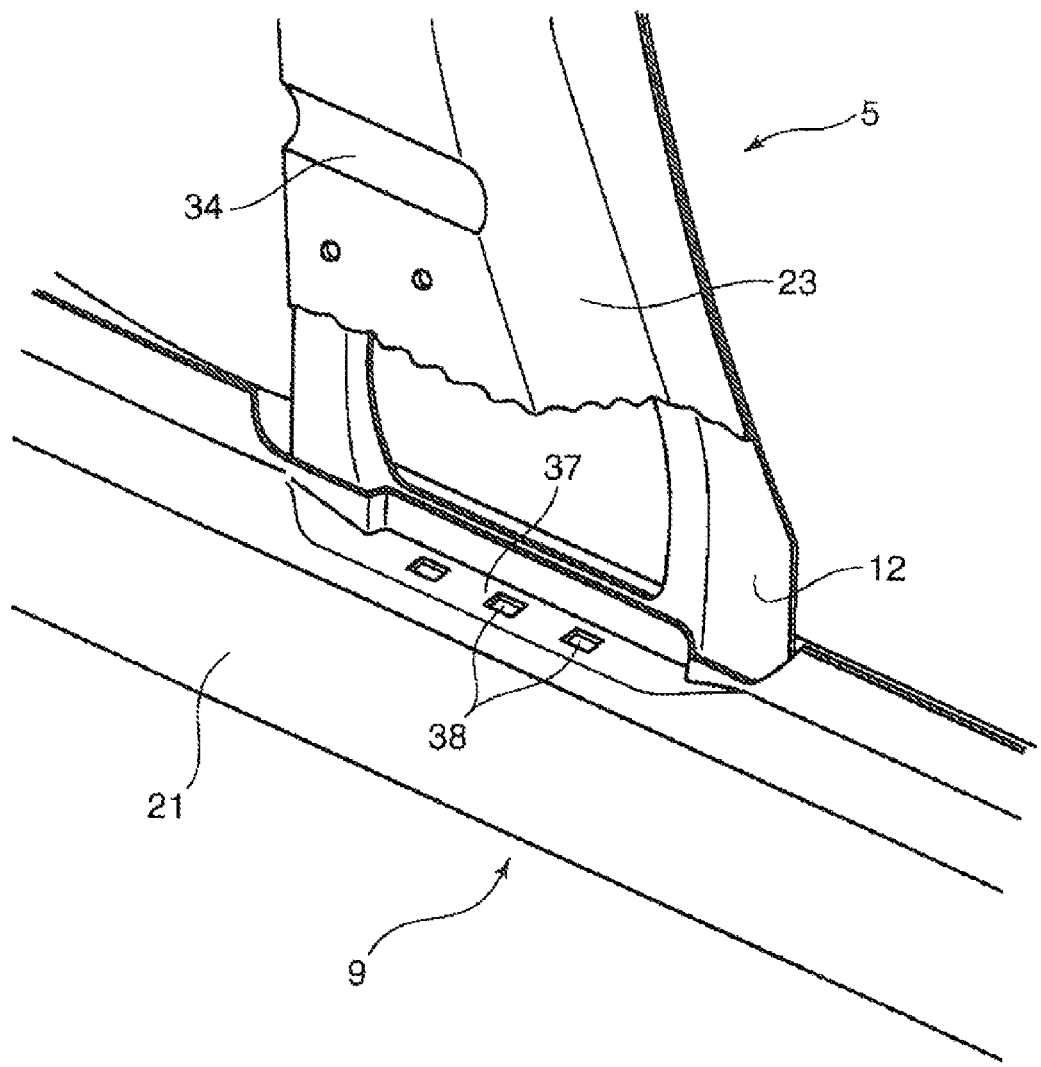
FIG. 11 is a perspective view showing around a connection portion of the center pillar to the side sill.

FIG. 11 is a perspective view showing around a connection portion of the center pillar 5 to the side sill 9. FIG. 11 shows a state in which the outer panels 11, 19 of the center pillar 5 and the side sill 9 are removed like FIG. 6 and most part of the lower part 24 of the pillar reinforcement 13 is cut off.

As shown in FIGS. 10 and 11, a concave 37 is formed by a specified portion of the upper face of the reinforcement 21 of the side sill 9, which corresponds to the connection portion to the center pillar 5, being concaved downward. This concave 37 extends over a range corresponding to the longitudinal width of the center pillar 5 as shown in FIG. 11. A vertical width X (see FIG. 10) of the reinforcement 21 at the above-described range is smaller than that of the other portion (portions located in front or back of the center pillar 5) by a depth ΔX of the concave 37.

Further, a plurality of openings 38 (three according to the present embodiment) is formed along the concave 37 in the vehicle longitudinal direction. Specifically, each opening 38 is of a quadrilateral shape, a pair of sides of which extends in the vehicle width direction and the other pair of sides of which extends in the vehicle longitudinal direction.

As described above, the convex 37 is formed on the upper face of the reinforcement 21 of the side sill 9 at the connection portion of the center pillar 5 to the side sill 9, and the openings 38 are formed at the convex 37. Herein, the convex 37 and the openings 38 promote deformation of the side sill 9 at the vehicle side crash, which corresponds to a deformation promoting portion of the present invention.

Hereinafter, the operations and advantages of the side vehicle-body structure of a vehicle according to the present embodiment will be described. As described above, according to the present embodiment, the pillar reinforcement 13 of the center pillar 5 comprises the upper part 23 and the lower part 24 with the boundary line Q of these parts 23, 24 being positioned below the middle level of the pillar reinforcement 13. The upper and lower parts 23, 24 of the pillar reinforcement 13 respectively include the side wall portions 25, 29 which extend along the side face of the vehicle body and the pairs of vertical wall portions 26, 30 which extend inwardly from the front and rear end portions of the side wall portions 25, 29. The pair of vertical wall portions 30 of the lower part 24 is slant relative to the vehicle width direction so that the distance between the pair of vertical wall portions 30 becomes wider toward the inward direction in the vehicle width direction, and the slant angle of the pair of vertical wall portions 30 of the lower part 24 is greater than that of the vertical portions 30 of the upper part 23. According to the above-described structure, the center pillar 5 can be restrained from coming into the vehicle inside at the vehicle side crash with a simpler structure.

That is, since the pair of vertical wall portions 30 of the lower part 24 of the pillar reinforcement 13 is slant relative to the vehicle width direction so that the distance between the pair of vertical wall portions 30 becomes wider toward the inward direction in the vehicle width direction, when the vehicle side crash occurs and the impact load toward the vehicle side acts on the lower part 24, the vertical wall potions 30 can easily deform so as to fall down (falling down toward the side of the pillar inner panel 12), thereby promoting crush of the lower part 24. Meanwhile, since the upper part 23 which constitutes the upper and middle portions of the pillar reinforcement 13 does not have so slant vertical wall portions 26 as the vertical wall portions 30 of the lower part 24 does, the load resistance of the upper part 23 against the load of the vehicle width direction can be ensured sufficiently. Thus, when the vehicle-side-crash impact load toward the vehicle inside is inputted to the center pillar 5, the lower portion of the center pillar 5 including the above-described lower part 24 deforms greatly first, so that the energy of this impact load can be absorbed by this portion and also deformations of the upper and middle portions of the center pillar 5 including the upper part 23 which has the higher load resistance can be effectively restrained. Then, since the center pillar 5 deforms in the above-described deformation mode, the middle portion of the center pillar 5 in the vertical direction can be prevented from bending greatly toward the vehicle inside, thereby effectively preventing any improper interference of the center pillar 5 with passengers in the vehicle.

Figure 12:
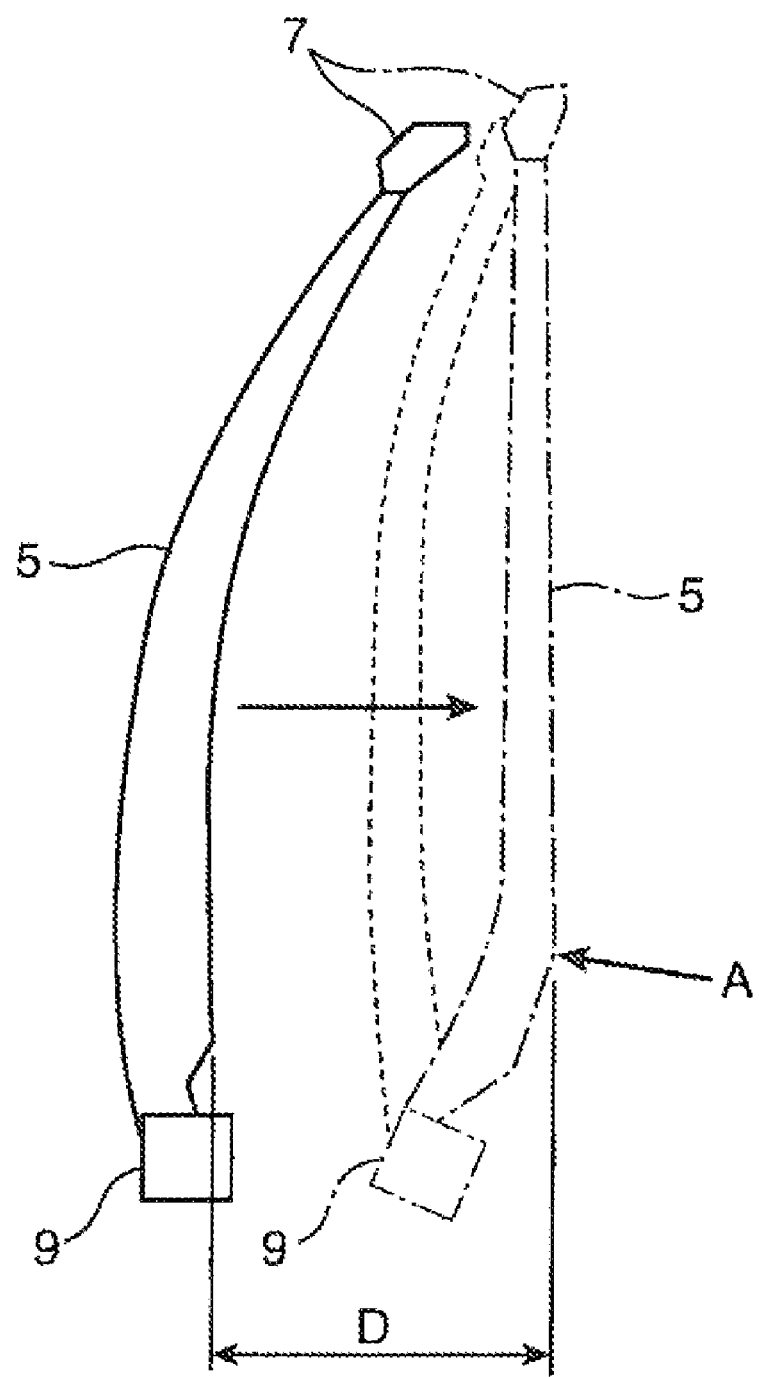
FIG. 12 is a schematic diagram showing a deformation mode in case the center pillar deforms at a vehicle side crash.

This point will be described more specifically referring to the schematic diagram of FIG. 12. In this FIG. 12, the center pillar 5 in its normal state is illustrated by solid lines, while the center pillar 5 when it is bent receiving the side impact load is illustrated by one-dotted broken lines. Herein, the center pillar 5 in its state before bending (deformation mode except the bending deformation) is imaginarily illustrated by broken lines. When the side impact load is inputted to the center pillar 5 as shown in FIG. 12, the center pillar 5 deforms inwardly (toward the vehicle inside) receiving the impact load. Herein, in case the pillar reinforcement 13 is configured such that its lower part 24 crushes easily as described above, the second moment of area of the lower portion of the center pillar 5 decreases so quickly that the bending deformation is promoted. Consequently, the center pillar 5 deforms toward the vehicle inside with its lower portion being greatly bent. In contrast, the upper and middle portions of the center pillar 5 includes the upper part 23 of the pillar reinforcement 13 which is highly load-resistant, so that the amount of deformation of the upper and middle portions of the center pillar 5 may be relatively small. This situation is shown in FIG. 12 in which the upper and middle portions of the center pillar 5 bend little, but the lower portion of the center pillar 5 bends greatly.

Figure 13:
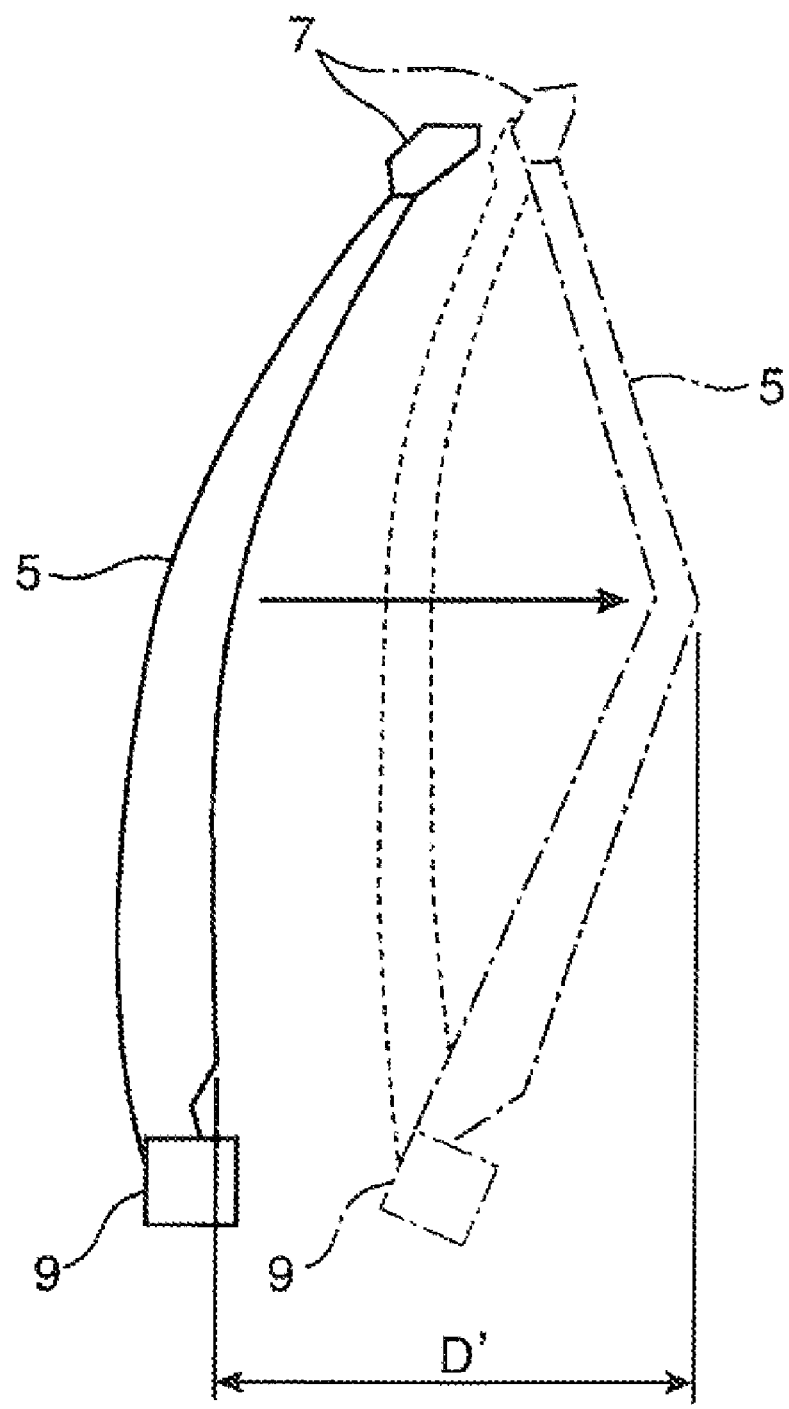
FIG. 13 is a schematic diagram showing a deformation mode in case the center pillar bends at its middle portion, which is a comparative example with FIG. 12.

Meanwhile, in case the middle portion of the center pillar 5 bends as shown in FIG. 13, this bending portion greatly comes into the vehicle inside, so that the center pillar 5 may improperly interfere with the passenger. According to the present invention, however, the lower part 24 of the pillar reinforcement 13 is configured to crush relatively easily, so that the lower portion of the center pillar 5 can be made deform greatly at the vehicle side crash. Thereby, the middle portion of the center pillar 5 is properly prevented from bending. Thus, since the maximum deformation amount D (see FIG. 12) toward the vehicle inside of the center pillar 5 is made smaller than the maximum deformation amount D' (see FIG. 13) of a case in which the middle portion of the center pillar 5 bends. Accordingly, the center pillar 5 can be effectively restrained from coming into the vehicle inside, thereby ensuring the safety of the passengers properly.

Further, since the above-described restraint of bending of the middle portion of the center pillar 5 can be achieved with a simple structure in which the section shape of the pillar reinforcement 13 is simply changed (different section shapes between the upper part 23 and the lower part 24), the restraint of the center pillar 5 from improperly coming into the vehicle inside at the vehicle side crash can be simply and effectively achieved.

Moreover, according to the present embodiment, as shown in FIG. 9, the pair of vertical wall portions 30 of the lower part 24 comprises the base portions 30a which extend inwardly in the vehicle width direction from the side wall portion 29, the slant portions 30b which extend obliquely forward and rearward from the base portions 30a, and the corner portions C which formed between the base portions 30a and the slant portions 30b. Thereby, since the wall portions of the lower part 24 easily deforms so as to fall down toward the vehicle inside (toward the side of the pillar inner panel 12) at the corner portion at the vehicle side crash, the deformation of the lower portion of the center pillar 5 including the lower part 24 can be effectively promoted, so that the bending of the middle portion of the center pillar 5 can be prevented and thereby the passenger can be properly protected.

Further, since the lower part 24 of the pillar reinforcement 13 has the relatively wide opening 39 (see FIGS. 6 and 7), the load resistance of the lower part 24 can be made smaller than that of the upper part 23. Accordingly, the deformation of the lower portion of the center pillar 5 at the vehicle side crash can be promoted more effectively.

According to the present embodiment, as shown in FIGS. 8 through 10, since the thickness of the lower part 24 in the vehicle width direction is set to be smaller than that of the upper part 23, the load resistance of the lower part 24 can be further reduced, thereby achieving the promotion of the deformation at the vehicle side crash.

Further, as shown in FIGS. 2, 6, 7 and others, the hinge attaching portions 35, 36 to which the door hinges 41, 42 of the rear side door 3 are attached are provided at the upper part 23 of the pillar reinforcement 13. Thereby, since the rear side door 3 is supported at the upper part 23 having the high load resistance via the door hinges 41, 42, the support rigidity of the rear side door 3 can be effectively improved.

More specifically, according to the present embodiment, the lower hinge-attaching portion 36 for the lower door hinge 42 of the rear side door 3 is provided near the lower end portion of the upper part 23, and the concave groove 34 as the bend promoting portion is formed at the position located above the lower hinge-attaching portion 36. Thereby, since the center pillar 5 tends to bend at the pint (a portion A shown in FIG. 12) of the convex groove 34, receiving the impact load inputted from the lower door hinge at the vehicle side crash, the bending of the middle portion of the center pillar 5 can be avoided surely. Accordingly, the center pillar 5 can be more effectively prevented from greatly coming into the vehicle inside to interfere with the passengers.

That is, the load acting on the rear side door 3 at the vehicle side crash is mainly transmitted via the impact bars 45 (FIG. 2) as rigidity members, and inputted to the center pillar 5 via the door hinges 41, 42. Herein, if the lower door hinge 42 is attached near the lower end portion of the upper part 23 and the concave groove 34 is formed at the position located above its attaching portion (lower hinge-attaching portion 36) as described above, when the impact load of the vehicle side crash is inputted from the lower door hinge 42, the pillar reinforcement 13 bends at the weak concave groove 34. Thus, the bending of the center pillar 5 at its middle portion can be effectively prevented from bending and thereby improperly interfering with the passengers.

Moreover, according to the present embodiment, as shown in FIGS. 10 and 11, the concave 37 as the deformation promoting portion which promotes the deformation of the side sill 9 when the center pillar 5 receives the impact load of the vehicle side crash is provided on the upper face of the reinforcement 21 of the side sill 9 at the connection portion of the center pillar 5 to the side sill 9. Thereby, the vertical width of the reinforcement 21 is smaller than that of the other portion by the depth of the concave 37, so that the rigidity of the connection portion of the side sill 9 to the center pillar 5 is smaller than that of the other portions. Additionally, the bending deformation of the reinforcement 21 caused by the boundary line (the corner portions) between the upper face of the reinforcement 21 and the concave 37 is promoted. As a result, the situation in which the deformation of the lower portion of the center pillar 5 is so obstructed by the side sill 9 that the desired deformation mode (FIG. 12) may not be obtained can be effectively prevented.

That is, it may be required that the lower portion of the center pillar 5 (which corresponds to the lower part 24 of the pillar reinforcement 13) deforms and bends greatly inwardly and thereby the sided sill 9 also deforms relatively greatly at the vehicle side crash in order that the center pillar 5 deforms with the deformation mode shown by the one-dotted lines in FIG. 12. Herein, in this case if the rigidity of the side sill 9 was too high, the deformation would be restrained too much, so that there is a concern that the deformation of the center pillar 5 in the above-described manner would be obstructed. According to the present embodiment, however, since the concave 37 is formed at the connection portion of side sill 9 to the center pillar 5, the necessary deformation of the side sill 9 at the vehicle side crash can be promoted by the existence of the concave 37. Accordingly, the center pillar 5 can be made deform with the desired deformation mode shown by the one-dotted broken line in FIG. 12.

Further, since the openings 38 are formed at the upper face of the concave 37 of the reinforcement 21 of the side sill according to the present embodiment, the rigidity of the side sill 9 at the connection portion to the lower end portion of the center pillar 5 can be further reduced more than the rigidity of the other portion of the side sill 9. Thereby, the situation, in which the deformation of the lower portion of the center pillar 5 is so obstructed by the side sill 9 that the desired deformation mode may not be obtained, can be more effectively prevented.

In particular, since the opening 38 of the present embodiment is configured to be of the quadrilateral shape, a pair of sides of which extends in the vehicle width direction and the other pair of sides of which extends in the vehicle longitudinal direction, the deformations of the side sill 9 in the vehicle width direction and the vehicle longitudinal direction which may be necessary for the desired deformation mode of the center pillar 5 at the vehicle side crash can be effectively promoted by the above-described quadrilateral shaped opening 38. Accordingly, the center pillar 5 can be made deform with the desired deformation mode more surely.

While the specific material of the pillar reinforcement 13 was not referred to in particular, the pillar reinforcement 13 may be preferably made of a press member which is formed through a thermal pressing (hot stamp). The thermal pressing is pressing of a steel plate by means of dice during a hot state. The dice can cool the steel plate so quickly that the steel place can be hardened properly. Thereby, the center pillar 5 can be reinforced properly without any weight increase, and the above-described prevention of the inward bending of the middle portion of the center pillar 5 can be surely achieved.

While the lower portion of the center pillar 5 may be reinforced in case the pillar reinforcement 13 is made of the above-described thermal press member, the load resistance of the lower portion of the center pillar 5 can be properly smaller by forming the shape of the lower part 24 of the pillar reinforcement 13 properly as described above (that is, the vertical wall portions 30 of the lower part 24 are formed to be more slant, or the like). Accordingly, even in case the above-described thermal pressing is applied to the pillar reinforcement 13, the desired deformation mode shown in FIG. 12 can be obtained.

In case the vertical wall portions 30 of the lower part 24 are formed in a bend shape having the corner portions C between the base portions 30*a* and the slant portions 30*b* like the present embodiment (see FIG. 9), since the cooling speed of the base portion 30*a* is different from that of the slant portion 30*b* during the thermal pressing of the pillar reinforcement 13, there occurs a difference in strength between these portions 30*a*, 30*b*. This strength difference can cause the sure deformation at the corner portion C and thereby make the lower part 24 crush more easily. Accordingly, the lower portion of the center pillar 5 including the lower part 24 deforms relatively greatly at the vehicle side crash, so that the bending of the middle portion of the center pillar 5 can be prevented more surely.

While the present embodiment comprises the concave 37 and the openings 38 at the connection portion of the side sill 9 to the center pillar 5 as the deformation promoting portion to promote the deformation of the side sill 9 at the vehicle side crash, either one of the concave 37 and the openings 38 may be applied as long as the desired deformation mode of the center pillar 5 can be obtained.

Further, while both of the vertical wall portions 30 of the lower part 24 of the present embodiment are slant relative to the vehicle width direction so that the distance between the pair of vertical wall portions 30 becomes wider toward the inward direction in the vehicle width direction, only one of the vertical wall portions 30 of the lower part 24 may be configured to be slant relative to the vehicle width direction so that the distance between the pair of vertical wall portions 30 becomes wider toward the inward direction in the vehicle width direction.

The present invention should not be limited to the above-descried embodiment, and any other modifications and improvements may be applied within the scope of a sprit of the present invention.

What is claimed is:

1. A side vehicle-body structure of a vehicle, comprising a center pillar which includes a pillar outer panel, a pillar inner panel, and a pillar reinforcement which is provided between the pillar outer panel and the pillar inner panel,
    wherein said pillar reinforcement comprises an upper part and an lower part, a boundary line of the upper and lower parts of the pillar reinforcement being positioned below a middle level of the pillar reinforcement in a vertical direction of a vehicle body, wherein each of the upper and lower parts of the pillar reinforcement includes a side wall portion which extends along a side face of the vehicle body and a pair of vertical wall portions which extend inwardly in a vehicle width direction from front and rear end portions of the side wall portion, and wherein at least one of the pair of vertical wall portions of said lower part of the pillar reinforcement is slant relative to the vehicle width direction so that the distance between the pair of vertical wall portions becomes wider toward an inward direction in the vehicle width direction, a slant angle of said at least one of the pair of vertical wall portions of the lower part of the pillar reinforcement being greater than that of the vertical portions of the upper part of the pillar reinforcement.

2. The side vehicle-body structure of a vehicle of claim 1, wherein at least one of said pair of vertical wall portions of the lower part of the pillar reinforcement comprises a base portion which extends inwardly in the vehicle width direction from said side wall portion, a slant portion which extends obliquely forward or rearward from the base portion, and a corner portion which formed between the base portion and the slant portion.

3. The side vehicle-body structure of a vehicle of claim 1, wherein a hinge attaching portion to which a door hinge of a rear side door is attached is provided at the upper part of the pillar reinforcement.

4. The side vehicle-body structure of a vehicle of claim 3, wherein said hinge attaching portion includes a lower hinge-attaching portion which is provided near a lower end portion of the upper part of the pillar reinforcement for attachment of a lower door hinge of the rear side door, and a bend promoting portion which is bent at a vehicle side crash to promote bending of the pillar reinforcement is formed at a position which is located above said lower hinge-attaching portion.

5. The side vehicle-body structure of a vehicle of claim 1, wherein a lower end portion of said center pillar is connected to a side sill which extends in a vehicle longitudinal direction, and a deformation promoting portion to promote deformation of the side sill when the center pillar receives an impact load of a vehicle side crash is provided at a connection portion of the center pillar to the side sill.

6. The side vehicle-body structure of a vehicle of claim 5, wherein said deformation promoting portion comprises a concave which is formed at an upper face of a reinforcement of the side sill.

7. The side vehicle-body structure of a vehicle of claim 5, wherein said deformation promoting portion comprises an opening which is formed at an upper face of a reinforcement of the side sill.

8. The side vehicle-body structure of a vehicle of claim 7, wherein said opening is of a quadrilateral shape, a pair of sides of which extends in a vehicle width direction and the other pair of sides of which extends in a vehicle longitudinal direction.

9. The side vehicle-body structure of a vehicle of claim 1, wherein said pillar reinforcement is a press member which is formed through a thermal pressing.

10. A side vehicle-body structure of a vehicle, comprising a center pillar which includes a pillar outer panel, a pillar inner panel, and a pillar reinforcement which is provided between the pillar outer panel and the pillar inner panel, wherein said pillar reinforcement comprises an upper part and an lower part, a boundary line of the upper and lower parts of the pillar reinforcement being positioned below a middle level of the pillar reinforcement in a vertical direction of a vehicle body, wherein each of the upper and lower parts of the pillar reinforcement includes a side wall portion which extends along a side face of the vehicle body and a pair of vertical wall portions which extend inwardly in a vehicle width direction from front and rear end portions of the side wall portion, wherein at least one of the pair of vertical wall portions of said lower part of the pillar reinforcement is slant relative to the vehicle width direction so that the distance between the pair of vertical wall portions becomes wider toward an inward direction in the vehicle width direction, a slant angle of said at least one of the pair of vertical wall portions of the lower part of the pillar reinforcement being greater than that of the vertical portions of the upper part of the pillar reinforcement, wherein at least one of said pair of vertical wall portions of the lower part of the pillar reinforcement comprises a base portion which extends inwardly in the vehicle width direction from said side wall portion, a slant portion which extends obliquely forward or rearward from the base portion, and a corner portion which formed between the base portion and the slant portion, and wherein a hinge attaching portion to which a door hinge of a rear side door is attached is provided at the upper part of the pillar reinforcement.

11. A side vehicle-body structure of a vehicle, comprising a center pillar which includes a pillar outer panel, a pillar inner panel, and a pillar reinforcement which is provided between the pillar outer panel and the pillar inner panel, wherein said pillar reinforcement comprises an upper part and an lower part, a boundary line of the upper and lower parts of the pillar reinforcement being positioned below a middle level of the pillar reinforcement in a vertical direction of a vehicle body, wherein each of the upper and lower parts of the pillar reinforcement includes a side wall portion which extends along a side face of the vehicle body and a pair of vertical wall portions which extend inwardly in a vehicle width direction from front and rear end portions of the side wall portion, wherein at least one of the pair of vertical wall portions of said lower part of the pillar reinforcement is slant relative to the vehicle width direction so that the distance between the pair of vertical wall portions becomes wider toward an inward direction in the vehicle width direction, a slant angle of said at least one of the pair of vertical wall portions of the lower part of the pillar reinforcement being greater than that of the vertical portions of the upper part of the pillar reinforcement, wherein at least one of said pair of vertical wall portions of the lower part of the pillar reinforcement comprises a base portion which extends inwardly in the vehicle width direction from said side wall portion, a slant portion which extends obliquely forward or rearward from the base portion, and a corner portion which formed between the base portion and the slant portion, wherein a hinge attaching portion to which a door hinge of a rear side door is attached is provided at the upper part of the pillar reinforcement, and wherein said hinge attaching portion includes a lower hinge-attaching portion which is provided near a lower end portion of the upper part of the pillar reinforcement for attachment of a lower door hinge of the rear side door, and a bend promoting portion which is bent at a vehicle side crash to promote bending of the pillar reinforcement is formed at a position which is located above said lower hinge-attaching portion.

* * * * *